US007006686B2

(12) United States Patent
Hunter et al.

(10) Patent No.: US 7,006,686 B2
(45) Date of Patent: Feb. 28, 2006

(54) IMAGE MOSAIC DATA RECONSTRUCTION

(75) Inventors: Andrew Arthur Hunter, Stapleton (GB); Stephen B Pollard, Gloucestershire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 553 days.

(21) Appl. No.: 09/906,786

(22) Filed: Jul. 18, 2001

(65) Prior Publication Data

US 2003/0063201 A1 Apr. 3, 2003

(51) Int. Cl.
*G06K 9/00* (2006.01)

(52) U.S. Cl. .................. 382/162; 382/167; 382/254; 382/263; 382/264; 348/235

(58) Field of Classification Search ............. 382/162, 382/167, 263, 264, 268, 269, 279; 348/222.1, 348/241, 246, 272, 273, 280, 234–238, 263; 345/606, 611, 615, 616; 358/518
See application file for complete search history.

(56) References Cited

U.S. PATENT DOCUMENTS

| | | | | |
|---|---|---|---|---|
| 4,176,313 | A | 11/1979 | Wrinn et al. ............. 348/235 |
| 4,642,678 | A | 2/1987 | Cok .......................... 348/242 |
| 5,357,354 | A * | 10/1994 | Matsunawa et al. ....... 358/530 |
| 5,629,734 | A | 5/1997 | Hamilton, Jr. et al. ... 348/222.1 |
| 5,771,318 | A * | 6/1998 | Fang et al. .................. 382/261 |
| 5,847,755 | A * | 12/1998 | Wixson et al. ............. 348/149 |
| 6,084,593 | A * | 7/2000 | Gibson ....................... 345/426 |
| 6,415,053 | B1 | 7/2000 | Norimatsu |
| 6,301,384 | B1 * | 10/2001 | Webb ......................... 382/167 |
| 6,493,029 | B1 * | 12/2002 | Denyer et al. ............. 348/236 |
| 6,608,942 | B1 * | 8/2003 | Le .............................. 382/279 |
| 6,842,191 | B1 * | 1/2005 | Smith ......................... 348/273 |

FOREIGN PATENT DOCUMENTS

| | | |
|---|---|---|
| EP | 0930789 A2 | 7/1999 |
| EP | 0996293 A2 | 4/2000 |

OTHER PUBLICATIONS

Rosenfeld et al. (Digital Image Processing, vol. 2, 2nd ed., 1982, pp. 86-87).*
Ozawa and Takahashi, "A Correlative Coefficient Multiplying (CCM) Method for Chrominance Moire Reduction in Single-Chip Color Video Cameras," *IEEE Transactions on Electron Devices*, vol. 38, No. 5 (May 1991), pp. 1217-1225.
Gonzalez and Woods, "Digital Image Processing," Addison-Wesley (Reading, Mass.) 1993, pp. 189-201.

* cited by examiner

*Primary Examiner*—Bhavesh M. Mehta
*Assistant Examiner*—Yubin Hung

(57) ABSTRACT

This invention relates to the reconstruction of a full colour image from an image mosaic composed of a plurality of image pixels that have one of at least three colour values. The pixels are interleaved in rows and columns across the mosaic with pixels of different colour values to form the mosaic in such a way that each row and column contains pixels of at least two colours. A high spatial frequency luminance image is generated from the mosaic that extends across all pixel locations of the image mosaic. The luminance values of pixels in the high frequency image are adjusted to reduce zippering effects. The adjustment is performed on pixels generated from a particular colour value at least in a first row and/or a first column of the high frequency luminance image according to the luminance values for said pixels and the luminance values of pixels generated from another colour value. A low spatial frequency luminance image is generated from the mosaic for each colour value. After the luminance adjustment the high frequency luminance pixels are combined with each of the low frequency luminance images in order to generate a de-mosaiced image for each of the colour values corresponding to said low frequency luminance images.

25 Claims, 6 Drawing Sheets

Black and White

RGB Mosaic

Red   Green   Blue

IMAGE MOSAIC DATA RECONSTRUCTION

FIELD OF THE INVENTION

This invention relates to the reconstruction of a full colour image from image mosaic data, in particular where the image mosaic data is unequally weighted between different colours.

BACKGROUND ART

Colour image sensors often capture an image using an array of photodetector elements, each of which is sensitive to a particular colour or range of colours. For example an image sensor may have a rectangular array of detector elements, covered by a matching array of red, green and blue filters. One common pattern is called a Bayer pattern, which has twice as many green detector elements as red or blue elements.

The captured image data is a mosaic of red, green and blue elements represented by three corresponding data sets. When a colour image is captured by such a detector, it is necessary to interpolate each colour to fill in the captured image data to cover sensor locations where there was no sensor for that colour.

After interpolation, each detector element location, or pixel, has associated with it image data for each of the colours, following which the image data can be stored or processed according to the needs of a particular imaging application.

A simple method for generating the full colour image from image mosaic data is to use bilinear de-mosaicing. By this method, each of the data sets is processed independently.

New red values (at the positions of blue and green mosaic elements) are interpolated from the values of nearby red mosaic elements. New blue values (at the positions of red and green mosaic elements) are interpolated from the values of nearby blue mosaic elements. New green values (at the positions of red and blue mosaic elements) are interpolated from the values of nearby green mosaic elements.

This method suffers from two main problems. The first is that each of the interpolated data sets of the final de-mosaiced image contains no more detail than was available in the original mosaic elements of the same single colour. So the red and blue data sets derived from a Bayer mosaic only have one quarter of the maximum achievable resolution, and the green data set only has half of the maximum resolution. The second problem is that fine details in an image may give artificially strong or weak responses in a particular data set depending upon whether or not the details fell on or missed pixels of that colour. This gives rise to conspicuous colour aliasing.

A better method is described in U.S. Pat. No. 4,176,373. This describes a colour camera system in which a higher sample rate is used for the green data set than for the red and blue data sets. The two sample rates are analogous to the two rates of occurrence of green and red/blue filters in the Bayer pattern. The difference between the higher sample rate green channel and a down sampled version of the green channel (to match the sample rates of the red and blue channels) is then added to the red and blue channels. Thus, this method generates a high frequency luminance signal (approximated by the high frequencies of the green channel) and adds it to the low frequency chrominance (approximated by the low frequency red and blue channels). This method avoids additional colour aliasing and preserves detail from the green channel, adding the detail to the other two channels. It does not reduce colour aliasing in the original samples and does not exploit detail from the red and blue channels, which together would typically contribute half of the original resolution.

Another method that produces better results than the bilinear method is described in U.S. Pat. No. 4,642,678. When this method is applied to a Bayer mosaic, a complete green data set is first derived by bilinear interpolation from the mosaic data. Instead of interpolating the values of red and blue mosaic elements to fill in the other colour channels as for the bilinear method, the ratios of the values of the red or blue mosaic elements to the interpolated green data set values are calculated at those points. The ratios themselves are interpolated to relate the red and blue values to the green values across the whole array. The missing red and blue values are then derived from the interpolated ratios and the green data set values at each point of the array. This method generates red, green and blue values at each pixel location without contributing to colour aliasing effects, but it does nothing to reduce the colour aliasing that may have been present in the original mosaic data. Also, most of the image detail comes from the green data set, but due to interpolation this has only half of the desired maximum achievable resolution.

While these methods succeed in reducing the worst colour aliasing problems, some achromatic patterning resulting from the original aliasing problem may persist. This manifests as a zippering artefact close to chromatic edges in which checkerboard intensity variations are observed either to one, other or both sides of the edge.

Reduced zippering effects are obtained using a method described in U.S. 5,629,734. Here the green channel is processed first using an adaptive interpolation scheme that depends upon both horizontal and vertical intensity local gradient measures (computed from green pixels alone and/or complementary red or blue pixels also). The green signal is interpolated either along the row or column depending which direction has the smallest gradient (if the gradients are equal the average of the row and column interpolation is preferred). The interpolation can involve a correction term derived from the neighbouring red or blue pixels. This results in a complete green image that is free from local patterning whose content is then used to interpolate both the red and blue versions. Thus, image pixels for each colour value in the original mosaic image are directly interpolated to fill in missing pixel locations in such a way as to reduce zippering effects. The bidirectional adaptive techniques used do, however, not reduce colour aliasing and zippering artefacts as much as desired.

It is an object of the current invention to provide a convenient and economical apparatus and method for reconstructing a full colour image from image mosaic data, with reduced or eliminated mosaic artefacts such as zippering effects.

SUMMARY OF THE INVENTION

According to one aspect of the invention, there is provided an image processing method for de-mosaicing an image mosaic, the image mosaic being composed of a plurality of image pixels and each image pixel having one of at least three colour values and having a luminance value representing the intensity of the colour value for that pixel in the image mosaic, the pixels of each colour value being interleaved in rows and columns across the image mosaic with pixels of different colour values to form the image, the method comprising the steps of:

i) generating from the image mosaic a high spatial frequency luminance image that extends across all pixel locations of the image mosaic, each pixel having a luminance value;

ii) adjusting the luminance values of pixels in the high spatial frequency luminance image in order to reduce mosaic artefacts, said adjustment being performed on pixels generated from a particular colour value at least in a first row and/or a first column of the high frequency luminance image according to the luminance values for said pixels and the luminance values of pixels generated from another colour value;

iii) generating for each colour value from the image mosaic a low spatial frequency luminance image, each pixel having a luminance value; and iv) after the adjustment of step ii), combining across all pixel locations the high frequency luminance pixels with each of the low frequency luminance images in order to generate a de-mosaiced image for each of the colour values corresponding to said low frequency luminance images.

According to another aspect of the invention, there is provided a device for de-mosaicing an image mosaic to form a full colour image, the device comprising a processor, software, and a memory, in which the memory stores image mosaic data representative of an image mosaic having a plurality of image pixels, said image mosaic data including for each pixel one of at least three colour values and a luminance value representing the intensity of the colour value for that pixel in the image mosaic, the pixels of each colour value being interleaved in rows and columns across the image mosaic with pixels of different colour values to form the image, wherein the processor, software and memory are operable to:

a) generate from the image mosaic a high spatial frequency luminance image that extends across all pixel locations of the image mosaic, each pixel having a luminance value;

b) adjust the luminance values of pixels in the high spatial frequency luminance image in order to reduce mosaic effects, said adjustment being performed on pixels generated from a particular colour value at least in a first row and/or a first column of the high frequency luminance image according to the luminance values for said pixels and the luminance values of pixels generated from another colour value;

c) generate for each colour value from the image mosaic a low spatial frequency luminance image, each pixel having a luminance value; and d) after the adjustment of the luminance value, combine across all pixel locations the high frequency luminance pixels with each of the low frequency luminance images in order to generate a de-mosaiced image for each of the colour values corresponding to said low frequency luminance images.

One way to reduce a mosaic effect such as zippering of pixels in a row or column is to adjust the luminance values of the high frequency image when differences between neighbouring pixels in said first row and/or column of the high frequency image are below a threshold value. This preserves sharp changes in colour. The neighbouring pixels may be immediately adjacent pixels or closely adjacent pixels.

In some applications it may be convenient if the low spatial frequency monochrome image is calculated for the full image so that this extends across all pixel locations of the image mosaic. It is possible, however, to reduce memory and processing requirements by performing this smoothing calculation just at the pixel locations for that colour value to generate a low resolution smoothed image. In the case of an image mosaic composed with the Bayer pattern, the red smoothed image would then extend only across one quarter of the pixel locations, with a corresponding reduction in the memory requirement.

The pixels of each colour value may be interleaved in rows and columns across the image mosaic with pixels of different colour values to form the image mosaic in such a way that at least some rows and/or columns contain image pixels of at least two colours.

There may be a predominance of pixels of one colour value as compared with the other colour values. Each row and column then may contain image pixels of both the predominant colour and one of the other colours. Usually, there will be three colour values, namely red, green and blue, and there is a predominance of pixels having a green colour value. In a preferred embodiment of the invention, the colour values of pixels in the image mosaic are arranged in a Bayer pattern.

In a preferred embodiment of the invention, step ii) of the method involves assessing differences between one or more adjacent pairs of pixels derived from the same non-predominant colour value, and differences between one or more adjacent pairs of pixels derived from the predominant colour value.

The adjustment to reduce zippering may involve scaling the luminance values of at least some of the pixels derived from the non-predominant colour value according to the luminance of the low spatial frequency image derived from the predominant colour value.

Preferably, the luminance value of at least some of the pixels derived from the non-predominant colour value are scaled according to the luminance derived from the low spatial frequency image of the predominant colour value by adding the luminance value derived from said non-predominant colour value pixels to luminance values from corresponding portions of said low spatial frequency image derived from the predominant colour value.

This has the advantage that the pixels derived from predominant colour value, which contain most of the spatial resolution information, are used in the scaling process.

In step ii) the adjustment may be performed separately in each row and/or a column of the high spatial frequency image. Alternatively, in step ii) the adjustment is performed separately for each possible combination of row and column of the high spatial frequency image. In either case, breaking down the correction computation into individual rows and columns, or intersections of rows and columns, helps to simplify the computation task, so that it may be implemented inexpensively in hardware.

In a preferred embodiment of the invention, the de-zippering process is performed individually across all pixels in said row and/or column which are derived from the non-predominant colour value, the adjustment of pixel luminance then only being performed when appropriate on that particular pixel.

For example, if the pixels derived from the predominant colour value alternate with pixels derived from one other colour in said row and/or column, the difference in luminance values which is evaluated may include differences in luminance values between five immediately adjacent pixels in said row or column. These pixels may be labelled one to five in the following manner. A first central pixel has the non-predominant colour, a second pixel and a third pixel each have the predominant colour, said second pixel being on one side of the first pixel and said third pixel being on the opposite side of the first pixel. A fourth pixel and a fifth pixel each have the non-predominant colour, said fourth pixel being adjacent the second pixel and said fifth pixel being adjacent the third pixel.

Then, in a preferred embodiment of the invention, the difference in luminance values which is evaluated includes a first differences between the second pixel and the third pixel, a second difference between the first pixel and the fourth pixel, and a third difference between the first pixel and the fifth pixel.

The method described above is most useful when combined with the following steps used in a de-mosaicing process for image mosaic data. For each colour value, a low spatial frequency monochrome image that extends across all pixel locations of the image mosaic is generated from the image mosaic pixels for that colour value. Then, the high spatial frequency luminance image is formed by first generating, for each colour value, from the pixels for that colour value a partial high spatial frequency luminance image that extends only across pixels locations of the image mosaic for that colour value. Finally, each of the partial high spatial frequency images is processed in order to reduce zippering artefacts, and then each of said processed partial high spatial frequency luminance images is used to sharpen each of the low frequency images to form a full colour de-mosaiced image.

Preferably, the three or more partial high spatial frequency images are combined to form a composite high spatial frequency luminance image that extends across all pixel locations of the image mosaic.

The high frequency component of each mosaic pixel is combined with the other two low frequency channels for that pixel to generate the two missing colours. Thus the high frequency signal may be considered to be essentially an achromatic signal, with all colour components having the same magnitude, that is combined with the low frequency signal for each colour value.

Because this method combines high frequency information from each colour with the low frequency components of the other colours, it retains and combines details from all the source pixels. Also, because this method adds achromatic high frequencies back into low frequency versions of the original signals, there may for many images be a reduction of any colour aliasing that was present in the original mosaic data.

It may be most convenient if the method includes the step of combining the three or more high spatial frequency images to form a high spatial frequency luminance image that extends across all pixel locations of the image mosaic. The high frequency image data from the three or more colour values then form composite high frequency image data representative of a high spatial frequency luminance image that extends across all pixel locations of the image mosaic. This composite high frequency image data can then be combined with each of the low spatial frequency monochrome images to generate the full colour image.

Another aspect of the invention concerns a method comprising the steps of:

a) forming a plurality of mosaic data sets, one for each colour value, and each such data set comprising elements that represent the luminance values of the pixels which have the corresponding colour value;

b) generating from each image mosaic data set, a smoothed image data set representative of the corresponding low spatial frequency monochrome image, and each such data set comprising elements that represent smoothed luminance values across all pixel locations of the image mosaic;

c) generating from each image mosaic data set, an image data set representative of the corresponding high spatial frequency image, and each such data set comprising elements that represent high frequency luminance values of the pixels which have the corresponding colour value;

d) after adjustment of the high frequency image data set to reduce zippering artefacts, using each high frequency image data set to sharpen each smoothed image data set to form a plurality of de-mosaiced image data sets, one for each colour value, and each such data set comprising elements that represent de-mosaiced luminance values of the pixels which have the corresponding colour value.

BRIEF DESCRIPTION OF THE DRAWINGS

The invention will now be described in further detail, by way of example with reference to the following drawings.

DETAILED DESCRIPTION

Figure 1:
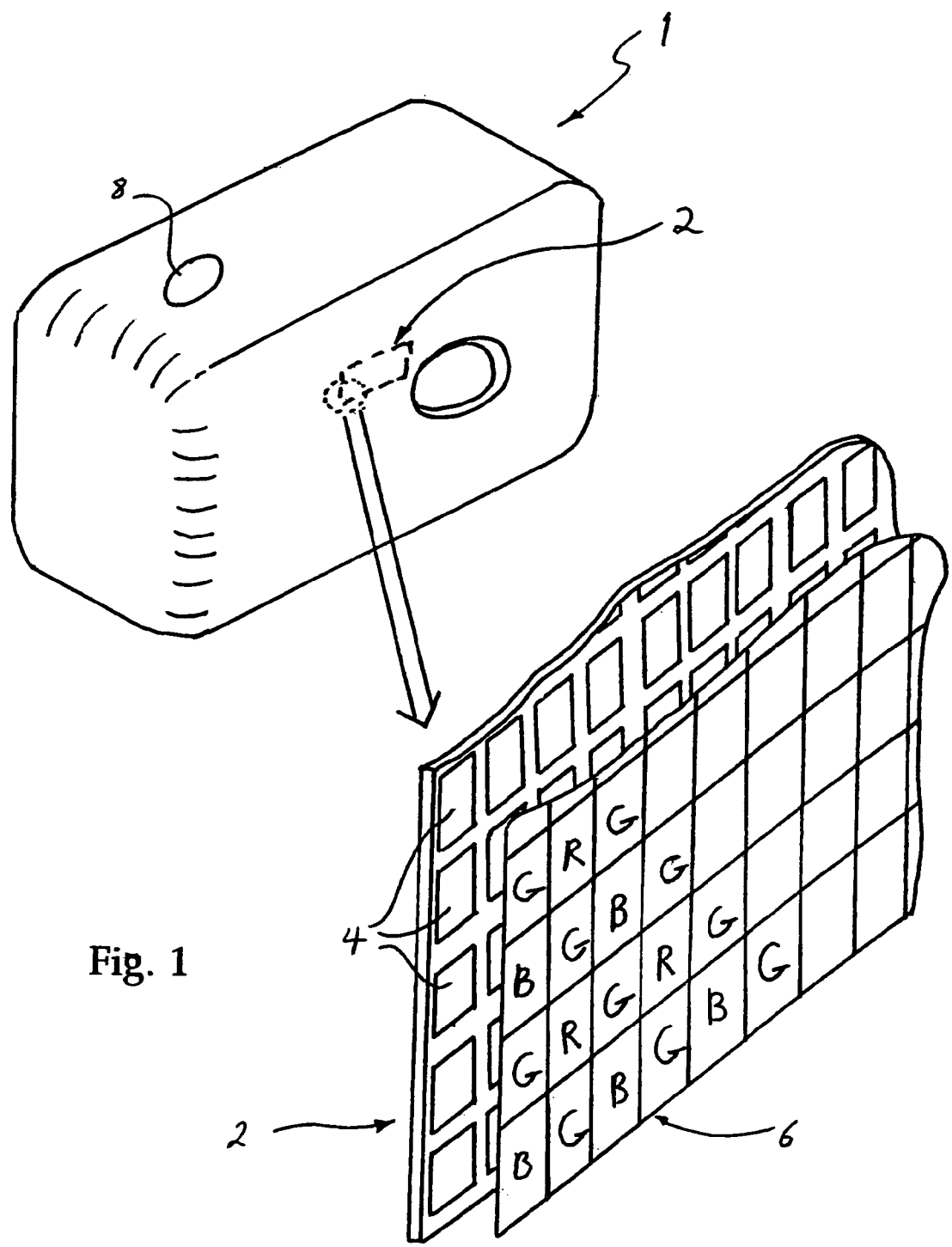
FIG. 1 shows schematically some of the internal components of a conventional electronic camera, including a colour sensor array having red, green and blue (RGB) imaging elements.

FIG. 1 shows one example of a consumer imaging device, here a hand-held digital camera 1. Such cameras have a colour image sensor 2 having a two-dimensional regular array of imaging elements or pixels 4. A typical consumer sensor array may have up to 4 Megapixels resolution, arranged in a rectangular array 2500 pixels wide and 1600 pixels high.

The imaging elements are sensitive to light across a wide spectrum of colours, and so the sensor array 2 is overlain by a mosaic-like pattern of colour filters 6. There are usually only three such colours, red (R), green (G) and blue (B), (RGB) and the colours are usually interleaved in a repeating pattern across the sensor array 2. Thus, the array elements 4 under each colour of filter 6 are sensitive only to light with wavelengths passed by each corresponding filter 6.

Many filter patterns exist, but the most common is the Bayer filter pattern. This consists of pixels with colour filters arranged in a rectangular grid pattern as set out below:

```
G R G R ... G R G R
B G B G ... B G B G
G R G R ... G R G R
   . . . . . . . . . . . .
B G B G ... B G B G
G R G R ... G R G R
B G B G ... B G B G
``` where R, G and B represent red, green and blue colour filters respectively. For the Bayer pattern, there is a preponderance of green pixels in the sensor array, with these contributing half of the full sensor resolution, while the red and blue pixels each contribute one quarter of the resolution.

Figure 2:
FIG. 2 shows an example of original black and white text to be imaged by a colour sensor array such as that in FIG. 1.
Figure 3:
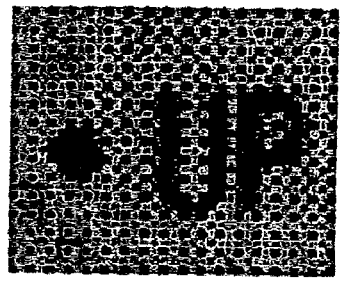
FIG. 3 shows the text when captured as an RGB mosaic image.

FIG. 2 shows an example of original black and white text 10, consisting of the symbols "•UP", to be imaged by the digital camera 1. The text 10 is part of a larger document (not shown) that is to be imaged in a desktop document imaging application. FIG. 3 shows how the text 10 is imaged as an RGB mosaic 12 within a small portion of the sensor array 2 consisting of 35 pixels in a horizontal direction and 29 pixels in a vertical direction.

Figure 4:
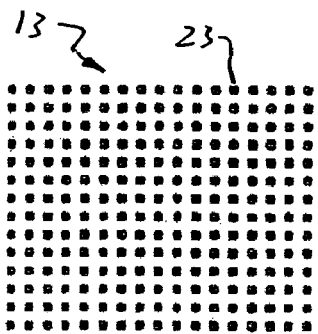
FIG. 4 shows the arrangement of red, green and blue pixels in the image mosaic of FIG. 3.
Figure 4:
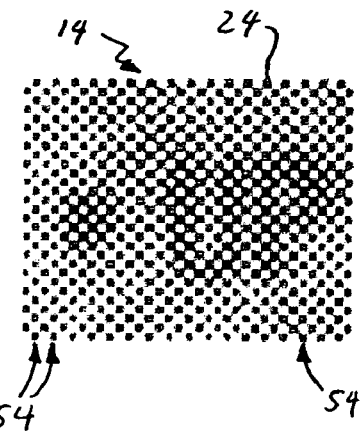
Figure 4:
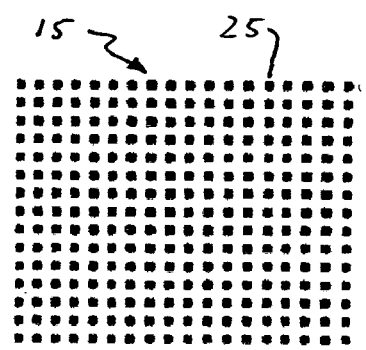

The Bayer pattern can be seen most clearly in FIG. 4, which shows for the three colour values red 16, green 17 and blue 18, three corresponding sub-images 13,14,15, each of which is composed of image pixels 23,24,25 having that colour value and a luminance value. As can be seen from the drawing, there are twice as many green pixels 24 as red pixels 23 or blue pixels 25. The original text 10 is visible as different luminance levels of the pixels 23,24,25.

Figure 5:
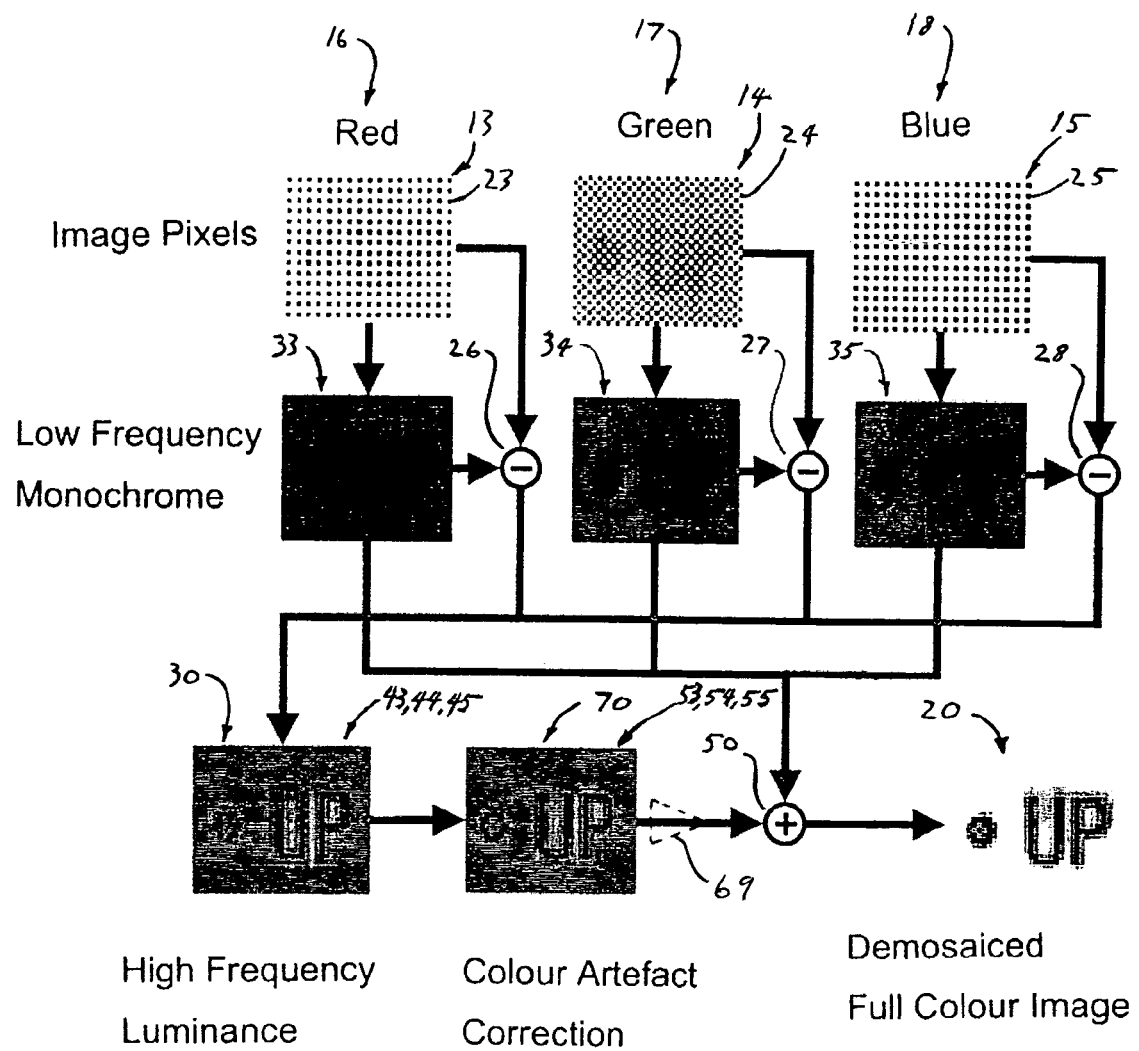
FIG. 5 shows schematically how the red, green and blue pixels are processed in a method according to the invention to yield a de-mosaiced full colour image, with colour artefact correction.

FIG. 5 shows schematically how the image mosaic 12 is processed to yield a de-mosaiced and de-zippered full colour image 20. First, for each colour value 16,17,18, a low spatial frequency image 33,34,35 is formed. Then, for each of the three colour values 16,17,18, a difference is taken 26,27,28 between the luminance level of each individual pixel 13,14, 15 for that particular colour value 16,17,18, and a corresponding point of the low spatial frequency image of the same colour value. This difference 26,27,28 is used to generate an achromatic high frequency image which when combined with similar differences for the other two colour values results in a composite achromatic high frequency image 30 that extends across all pixels locations in the original RGB image mosaic 12.

Therefore, the resulting composite image 30 is a black and white high frequency version of the original RGB mosaic image 12. Most conveniently, the high frequency image 30 consists of three sets of high frequency image pixels 43,44, 45 at locations in the composite image 30 that correspond with the locations of corresponding sets of pixels 13,14,15 in the original RGB mosaic image 12. As can be seen in FIG. 5, these pixels 43,44,45 have different luminance values.

The next step, gradient dependent adaptive row/column correction on the high frequency mosaic, provides the main benefits of the invention. The basic idea is to correct zippering artefacts in elements of the high frequency mosaic 43,45 that were derived from red and blue pixels 13,15 by scaling them in accordance with like pixels, 44, derived from green pixels in the original mosaic 14.

To avoid zippering problems the scaling is performed with respect to either a single row or column of pixels or just the combination of a single row and column. For the Bayer pattern, individual rows and columns consist of just those high frequency pixels derived from red and green or just blue and green mosaic pixels 14.

The choice whether to perform the correction along just a row, just a column or both depends upon the local image gradients (within the high frequency image) measured around the red or blue derived pixel under consideration.

This method has the advantage of being relatively easy to compute in electronic hardware, while still giving good reconstructed image quality.

The process described above can be represented mathematically as follows. Let the low spatial frequency versions of the red R, green G and blue B pixels 13,14,15 be labelled $R_S$, $G_S$ and $B_S$ respectively, where the subscript letter "S" stands for "smoothed". Each of the low spatial frequency monochrome images 33,34,35 is formed by two-dimensional interpolation (to fill in missing pixel locations) combined with low pass spatial filtering (examples of spatial filters including low pass or smoothing filters are given in Digital Image Processing, by Gonzalez and Woods, pages 189 to 201, Addison & Wesley, 1992). Here, the smoothed images 33,34,35 are formed individually for each of the three colour values 16,17,18 using bilinear interpolation and block averaging. All three smoothed images 33,34,35 then extend across locations corresponding with all elements of the RGB mosaic pattern 12.

In the preferred embodiment of the invention, the high frequency component of each mosaic pixel is given by subtracting the original mosaic value from the smoothed value of the same colour at the same point.

| At a Red Pixel | At a Green Pixel | At a Blue Pixel |
| --- | --- | --- |
| $R_H = R - R_S$ | $G_H = G - G_S$ | $B_H = B - B_S$ |

Where the 'H' subscript stands for high frequency.

To reduce the computation required for the de-mosaicing process, it is possible to reduce the number of mosaic pixel locations at which the mosaic pattern is spatially filtered to produce the low spatial resolution images. This results in smoothed images with lower spatial frequencies than might otherwise be the case, but at no great ultimate loss in information content, for the reason that image details are reintroduced by adding the high frequencies as described above. Preferably, low pass images are computed only for a subset of the green pixels 14, for example as shown in FIG. 4 those green pixels in columns 54 (or alternatively rows) having both green pixels 14 and red pixels 13. For the Bayer pattern, this requires one quarter of the computation while the image quality remains almost constant.

Therefore, each of the high spatial frequency images 43,44,45 is formed for each of the colour values 16,17,18 from the difference 26,27,28 between the luminance values of the image mosaic pixels 16,17,18 for that colour value and corresponding portions of the low spatial frequency monochrome image 33,34,35 for that same colour value 16,17,18.

In other words, the high frequency component of each mosaic pixel is given by subtracting the mosaic value from the corresponding location of a low frequency version of the image for the same colour value.

In the preferred embodiment of the invention, the local image gradients of the high frequency images 43,44,45 are measured according to the method set out below for red, 43, or blue, 45, derived pixels:

$$GradH_1=abs(I[i][j-1]-I[i][j+1]);$$

$$GradH_2=abs(2*I[i][j]-I[i][j-2]-I[i][j+2]);$$

$$GradV_1=abs(I[i-1][j]-I[i+1][j]);$$

$$GradV_2=abs(I[i][j]*2-I[i-2][j]-I[i+2][j]);$$

where I is the intensity of a particular pixel in the high spatial frequency image, and (i,j) are respectively (row,column) indices, and "abs" is the absolute value.

The horizontal and vertical difference results, gradH and gradV, are respectively the horizontal and vertical components of two measures of pixel intensity gradient in the row or column, denoted by the subscripts 1 and 2. Subscript 1 relates to a first difference measure based upon the neighbouring green derived pixels and subscript 2 relates to a second difference measure of the current pixel colour using also the next door but one neighbouring pixels along the row and column. Finally, the two measures of intensity gradient measure are combined, for example by simple addition.

Once horizontal and vertical gradients have been measured the following gradient based selection scheme is used to determine whether row, column or row and column correction is to be utilised.

```
IF (gradV>GRAD_THRESHOLD1 AND
    gradH>GRAD_THRESHOLD1)
        do_nothing
ELSE IF (gradV<GRAD_THRESHOLD2 AND
    gradH<GRAD_THRESHOLD2)
        use_row_and_column_correction
ELSE IF (gradH>gradV)
        use_column_correction
ELSE
        use_row_correction
``` where "use_row_and_column_correction" implies the mean value obtained by row correction and column correction individually. GRAD_THRESHOLD1 is a high threshold (that can larger than the largest possible gradient so as to include all cases) and GRAD_THRESHOLD2 is a lower threshold (that can be zero). The idea is to avoid attempting to correct zippering artefacts across steep edges where the trend in green derived pixels may not be mirrored in the other colour.

Figure 6:
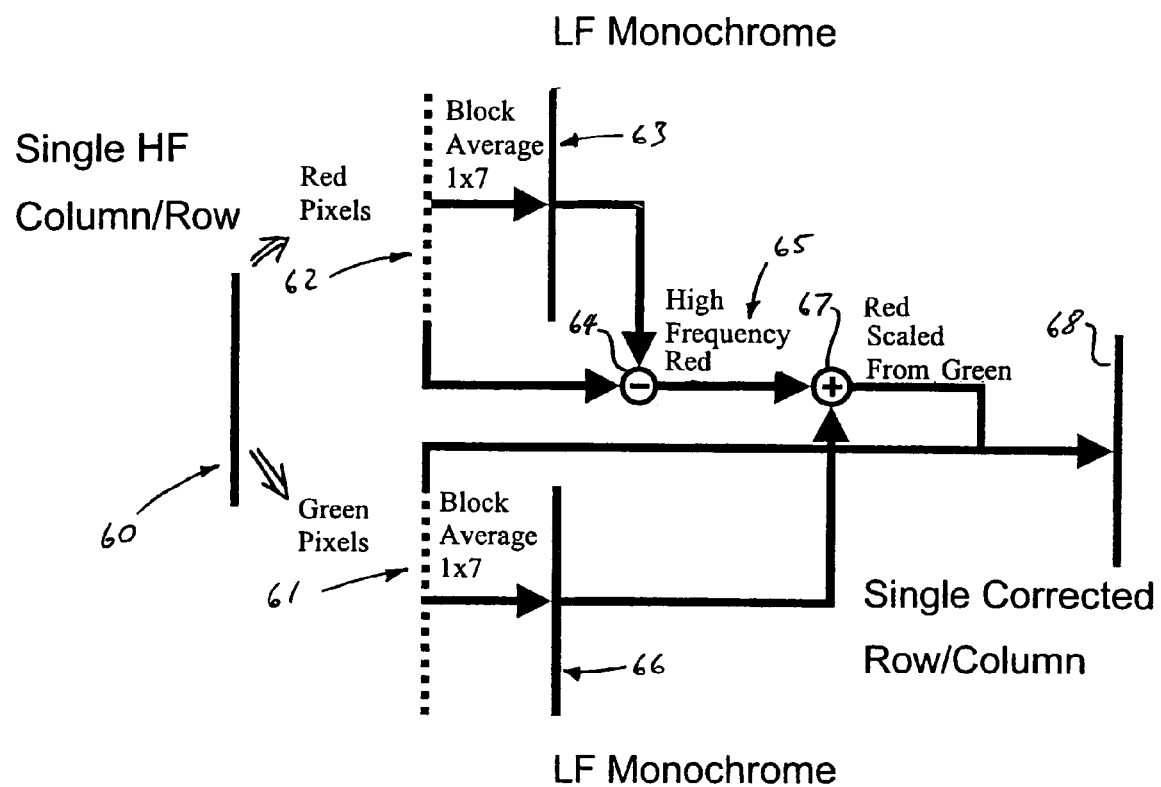
FIG. 6 is a schematic diagram showing how colour artefact correction is performed on one column containing high frequency red pixels, using information from low spatial frequency green pixels.

FIG. 6 illustrates the process of column correction for a red/green derived column 60 of the high frequency image 30; row correction is essentially the same except flipped through 90 degrees. In either case the process is identical for correcting blue pixels, as so this will not be separately illustrated. Green derived pixels 61 always remain unchanged by the correction process, but red derived pixels 62 are corrected. Corrected red derived pixels are obtained by first forming a smoothed and interpolated line of low spatial frequency red derived pixels 63, using a 1×7 block average. The original red derived pixels 62 are then subtracted 64 from the low spatial frequency line of red derived pixels 63 to yield a similar line of high spatial frequency red derived pixels 65.

A low spatial frequency line of green derived pixels 66 is formed in a similar manner to that for the red derived pixels, and this is then added 67 to the high spatial frequency red derived pixels 65 to yield a single corrected row or column of red/green derived pixels 68 (of which the green derived elements are copied as is from 61). Once corrected rows and columns are combined according to the gradient based selection scheme outlined above for all pixels in the high frequency image 30, it yields a colour artefact corrected high spatial frequency image 70, as shown in FIG. 5, which exibits reduced zippering effects. The method not only reduces zippering effects between the different colour values, but still allows local high frequency variations to survive.

The de-mosaiced full colour image 20 is then formed for each of the colour values 16,17,18 by summing the corrected high spatial frequency images 70 with corresponding portions of the low spatial frequency monochrome images 33,34,35 for that colour value. In particular, each high frequency pixel 53,54,55 of the achromatic corrected high frequency luminance image 70 is added 50 to a corresponding portion of each of the three low spatial frequency images 33,34,35, which results in the de-mosaiced full colour image 20.

It is, however, optionally possible at only a small incremental computational expence, to perform some degree of additional sharpening by modifying the corrected high frequency image 70 prior to full reconstruction 50 of the de-mosaiced image 20. The easeiest way to do this is to apply an overall sharpening gain 69, for example a linear multiplication of all elements in high frequency image. Alternatively non-linear sharpening can be implemented by way of a look up table applied to the elements of the adjusted high frequency image 70.

The method has been shown to give improved de-mosaicing of high frequency information such as text leading to improved visual appearance and optical character recognition, at a reasonable cost in terms of computational complexity. The improvement is a consequence of applying the de-zippering correction to the intermediate high frequency image, rather than to the original image mosaic.

Figure 7:
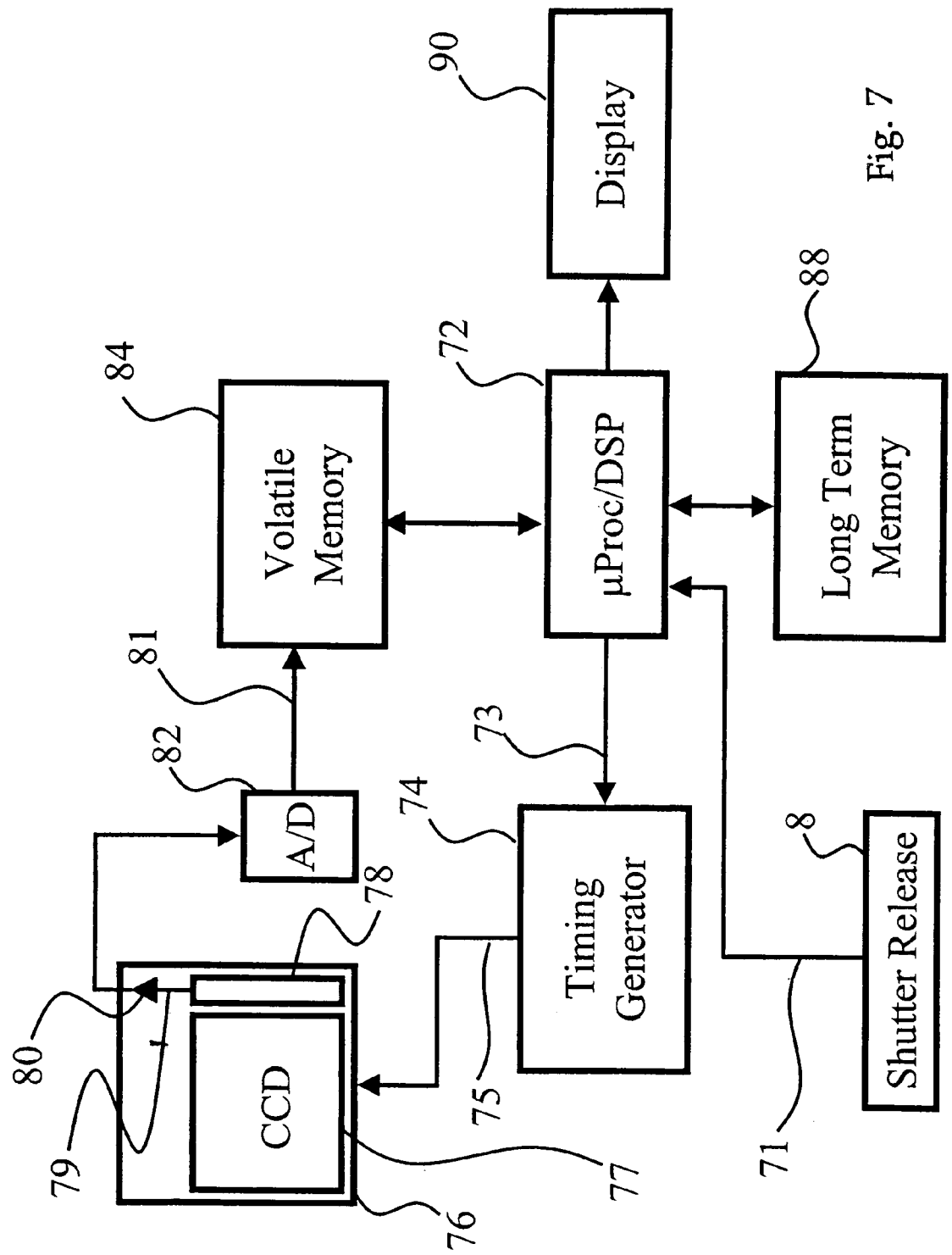
FIG. 7 is a circuit schematic diagram from a device according to the invention for de-mosaicing an image mosaic to form a full colour image, the device comprising a processor, software, and a memory.
Figure 8:
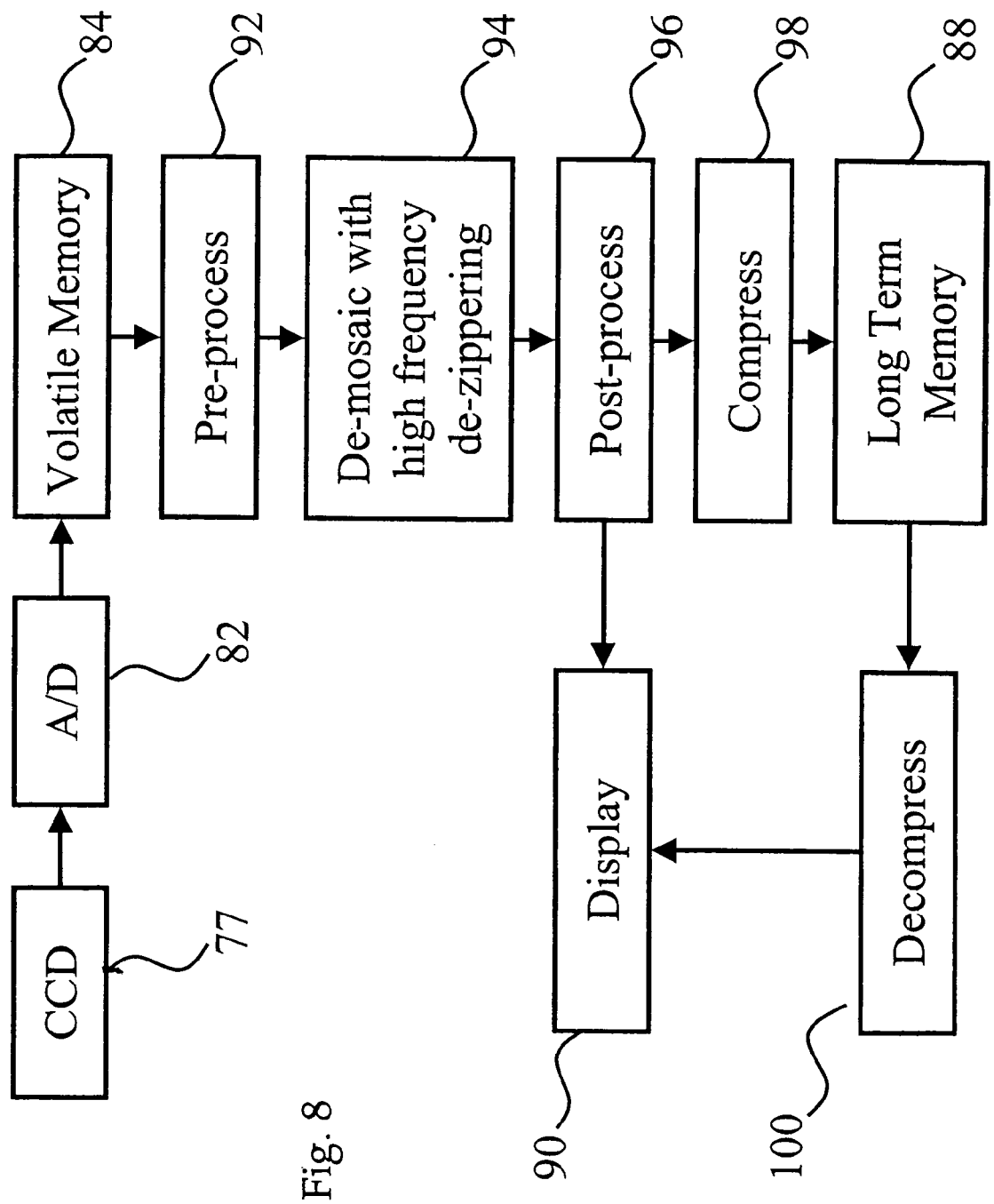
FIG. 8 is a flow chart illustrating a preferred embodiment of the method according to the invention for de-mosaicing an image mosaic to yield a full colour image.

This process may be readily implemented in hardware, illustrated in block schematic form in FIG. 7, and illustrated in more detail in the flowchart of FIG. 8.

A shutter release mechanism 8 when activated by a user sends a signal 71 to a microprocessor unit 72, which may include a digital signal processor (DSP). The microprocessor then sends an initiation signal 73 to a timing generator 74, whereupon the timing generator sends a trigger signal 75 to an electronic image sensor unit 76.

The sensor 76 consists of an imaging area 77 consisting of an array of sensing elements (typically either of a photogate or alternatively photodiode construction) and a serial readout register 78 from where an analogue signal 79 is generated via an amplifier 80. This signal 79 is generated upon receipt by the sensor unit 76 of the trigger signal 75.

The amplified analogue signal 79 is converted to a digital signal 81 by an A/D unit 82. The resulting raw digital image data is stored temporarily in a volatile memory 84.

Image processing according to the present invention can then be performed by the microprocessor unit 72. The microprocessor may include additional DSP capability in the form of specialised block of hardware to carry out specific functions or an additional more general DSP co-processor.

The processing itself may be performed according to the steps outlined in the flow-chart of FIG. 8. These include a pre-processing stage, 92, which may typically include correction of the OECF (opto-electronic conversion function) of the sensor and white-balancing to compensate for variations in illumination. Following the de-zippering and de-mosaicing stage 94 described above, a subsequent postprocessing stage 96 may include exposure correction (which can also be accomplished at the pre-processing stage) and transformation to a standard colour space such as sRGB (as described in IEC 61966-2-1). Finally the reconstructed RGB image data can be compressed 98 and stored in long term memory 88 using a standard image compression scheme such as the ubiquitous JPEG scheme.

Additionally a display device, 90, may be incorporated into the design. Images can be displayed live to facilitate view-finding or reviewed from long term memory requiring an additional decompress processing stage 100.

Although a preferred embodiment of the invention has been described with reference to the Bayer pattern of image pixels, the invention is applicable to cases where not all rows and/or columns contain image pixels of at least two colours. For example, some mosaics have pure green rows or columns interleaved with red/blue rows or columns. The invention is equally applicable to such image mosaics.

It is not strictly necessary to store the whole raw image frame in volatile memory. The image processing can be performed on the fly, thus requiring only as much memory as is necessary to perform the imaging pipeline. So after the first few rows of image data have been read from the sensor into memory it is possible to generate compressed image data for the start of the image and begin storing these in long term memory. This results from the fact that all processes are essentially local and operate only on a limited area of the image.

In other words, although the "images" constructed at each stage of the process could be complete sets of data that extend across the entire image, in practice this adds cost in terms of memory and possible throughput. Therefore, the "images" used at each stage of the process will in general be created piecemeal, with the process operating locally. In the limit all the computation may be carried out for a single pixel from the pixels in its neighbourhood.

The invention therefore provides an efficient method for reconstructing a high quality image with the full sensor resolution in each of the red, green and blue colour channels.

The method described above for reconstructing a full colour image from image mosaic data is computationally attractive and utilises all three colour values of the mosaic to produce high resolution colour images that are largely free from colour artefacts such as aliasing or zippering. The method has been shown to be particularly suited to images containing text, particularly monochrome images, and achieves a high quality full colour image at a modest cost in terms of computational complexity.

The invention therefore provides an efficient method for reconstructing a high quality image with the full sensor resolution in each of the red, green and blue colour channels.

The invention claimed is:

1. An image processing method of de-mosaicing an image mosaic, the image mosaic including a plurality of image pixels and each image pixel having one of at least three colour values and having an intensity value representing the intensity of the colour value for that pixel in the image mosaic, the pixels of each colour value being interleaved in rows and columns across the image mosaic with pixels of different colour values and thereby form the image mosaic, the method comprising the steps of:
   i) generating from the image mosaic a high spatial frequency image that extends across all pixel locations of the image mosaic, each pixel having an intensity value;
   ii) reducing mosaic artifacts by adjusting the intensity values of pixels in the high spatial frequency image, said adjustment being performed on pixels generated from a particular colour value at least in a first row and/or a first column of the high frequency image according to the intensity values for said pixels and the intensity values of pixels generated from another colour value;
   iii) generating for each colour value from the image mosaic a low spatial frequency intensity image, each pixel having an intensity value;
   iv) after the adjustment of step ii), generating a demosaiced image for each of the colour values corresponding to said low frequency images by combining across all pixel locations the high frequency pixels with each of the low frequency intensity images;
   v) in step i), forming the high spatial frequency image by first generating, for each colour value, from the pixels for that colour value, a partial high spatial frequency image that extends only across pixel locations of the image mosaic for that colour value;
   vi) reducing mosaic artifacts by processing each of the partial high spatial frequency images according to step ii), and then using each of said processed partial high spatial frequency images in combination with each of the low frequency images to form a full colour demosaiced image.

2. An image processing method as claimed in claim 1, wherein step ii) includes adjusting the intensity values of the high frequency image in response to differences between neighbouring pixels in said first row and/or column of the high frequency image being below a first threshold value.

3. A method as claimed in claim 1, in which in step iii), the low spatial frequency image extends across all pixel locations of the image mosaic.

4. A method as claimed in claim 1, in which in step iii), the low spatial frequency image is calculated separately in local areas of the image mosaic.

5. A method as claimed in claim 1, comprising the step of:
   vii) for each colour value, generating from the image mosaic pixels for that colour value a low spatial frequency image that extends across all pixel locations of the image mosaic.

6. An image processing method of de-mosaicing an image mosaic, the image mosaic including a plurality of image pixels and each image pixel having one of at least three colour values and having an intensity value representing the intensity of the colour value for that pixel in the image mosaic, the pixels of each colour value being interleaved in rows and columns across the image mosaic with pixels of different colour values and thereby form the image mosaic, the method comprising the steps of:
   i) generating from the image mosaic a high spatial frequency image that extends across all pixel locations of the image mosaic, each pixel having an intensity value;
   ii) reducing mosaic artifacts by adjusting the intensity values of pixels in the high spatial frequency image, said adjustment being performed on pixels generated from a particular colour value at least in a first row and/or a first column of the high frequency image according to the intensity values for said pixels and the intensity values of pixels generated from another colour value;
   iii) generating for each colour value from the image mosaic a low spatial frequency intensity image, each pixel having an intensity value; and
   iv) after the adjustment of step ii), generating a demosaiced image for each of the colour values corresponding to said low frequency images by combining across all pixel locations the high frequency pixels with each of the low frequency intensity images, wherein step ii) includes adjusting the intensity values of the high frequency image in response to differences between neighbouring pixels in said first row and/or column of the high frequency image being below a first threshold value, wherein step ii) includes adjusting the intensity values of the high frequency image in response to differences between neighbouring pixels in said row(s) and column(s) of the high frequency image being below a second threshold value, said adjustment being performed on pixels generated from a particular colour value in both row(s) and column(s) of the high frequency image, and the second threshold value being less than the first threshold value.

7. An image processing method as claimed in claim 6, in which there is a predominance of pixels of one colour value as compared with the other colour values, each row and column having image pixels of both the predominant colour and one of the other colours.

8. An image processing method as claimed in claim 7, wherein step ii) includes assessing differences between one or more adjacent pairs of pixels that have been derived from the same non-predominant colour value, and differences between one or more adjacent pairs of pixels that have been derived from the predominant colour value.

9. An image processing method as claimed in claim 7, wherein the adjustment of step ii) includes scaling the intensity values of at least some of the pixels of the non-predominant colour value according to the intensity value of the low spatial frequency image of the pixels derived from the predominant colour value.

10. A method as claimed in claim 7, in which pixels with the predominant colour value alternate with pixels of one other colour in said row and/or column, and the difference in intensity values which is evaluated includes differences in intensity values between five immediately adjacent pixels in said row or column, said five pixels consisting of a first central pixel having the non-predominant colour, a second pixel and a third pixel each having the predominant colour, said second pixel being on one side of the first pixel and said third pixel being on the opposite side of the first pixel, and a fourth pixel and a fifth pixel each having the non-predominant colour, said fourth pixel being adjacent the second pixel and said fifth pixel being adjacent the third pixel.

11. An image processing method of de-mosaicing an image mosaic, the image mosaic including a plurality of image pixels and each image pixel having one of at least three colour values and having an intensity value representing the intensity of the colour value for that pixel in the image mosaic, the pixels of each colour value being interleaved in rows and columns across the image mosaic with pixels of different colour values and thereby form the image mosaic, the method comprising the steps of:

i) generating from the image mosaic a high spatial frequency image that extends across all pixel locations of the image mosaic, each pixel having an intensity value;

ii) reducing mosaic artifacts by adjusting the intensity values of pixels in the high spatial frequency image, said adjustment being performed on pixels generated from a particular colour value at least in a first row and/or a first column of the high frequency image according to the intensity values for said pixels and the intensity values of pixels generated from another colour value;

iii) generating for each colour value from the image mosaic a low spatial frequency intensity image, each pixel having an intensity value; and iv) after the adjustment of step ii), generating a demosaiced image for each of the colour values corresponding to said low frequency images by combining across all pixel locations the high frequency pixels with each of the low frequency intensity images, wherein step ii) includes adjusting the intensity values of the high frequency image in response to differences between neighbouring pixels in said first row and/or column of the high frequency image being below a first threshold value, in which there is a predominance of pixels of one colour value as compared with the other colour values, each row and column having image pixels of both the predominant colour and one of the other colours, wherein the adjustment of step ii) includes scaling the intensity values of at least some of the pixels of the non-predominant colour value according to the intensity value of the low spatial frequency image of the pixels derived from the predominant colour value, in which the intensity value of at least some of the pixels derived from the non-predominant colour value are scaled according to the intensity value of the low spatial frequency image of the pixels derived from the predominant colour value by adding the difference between the intensity value derived from said non-predominant colour value pixels and the low spatial frequency image derived from said non-predominant colour value pixels to intensity values from corresponding portions of said low spatial frequency image derived from the predominant colour value.

12. An image processing method of de-mosaicing an image mosaic, the image mosaic including a plurality of image pixels and each image pixel having one of at least three colour values and having an intensity value representing the intensity of the colour value for that pixel in the image mosaic, the pixels of each colour value being interleaved in rows and columns across the image mosaic with pixels of different colour values and thereby form the image mosaic, the method comprising the steps of:

i) generating from the image mosaic a high spatial frequency image that extends across all pixel locations of the image mosaic, each pixel having an intensity value;

ii) reducing mosaic artifacts by adjusting the intensity values of pixels in the high spatial frequency image, said adjustment being performed on pixels generated from a particular colour value at least in a first row and/or a first column of the high frequency image according to the intensity values for said pixels and the intensity values of pixels generated from another colour value;

iii) generating for each colour value from the image mosaic a low spatial frequency intensity image, each pixel having an intensity value; and iv) after the adjustment of step ii), generating a demosaiced image for each of the colour values corresponding to said low frequency images by combining across all pixel locations the high frequency pixels with each of the low frequency intensity images wherein step ii) includes adjusting the intensity values of the high frequency image in response to differences between neighbouring pixels in said first row and/or column of the high frequency image being below a first threshold value, in which there is a predominance of pixels of one colour value as compared with the other colour values, each row and column having image pixels of both the predominant colour and one of the other colours in which pixels with the predominant colour value alternate with pixels of one other colour in said row and/or column, and the difference in intensity values which is evaluated includes differences in intensity values between five immediately adjacent pixels in said row or column, said five pixels consisting of a first central pixel having the non-predominant colour, a second pixel and a third pixel each having the predominant colour, said second pixel being on one side of the first pixel and said third pixel being on the opposite side of the first pixel, and a fourth pixel and a fifth pixel each having the non-predominant colour, said fourth pixel being adjacent the second pixel and said fifth pixel being adjacent the third pixel, and in which the difference in intensity values which includes a first difference between the second pixel and the third pixel, a second difference between the first pixel and the fourth pixel, and a third difference between the first pixel and the fifth pixel.

13. An image processing method of de-mosaicing an image mosaic, the image mosaic including a plurality of image pixels and each image pixel having one of at least three colour values and having an intensity value representing the intensity of the colour value for that pixel in the image mosaic, the pixels of each colour value being interleaved in rows and columns across the image mosaic with pixels of different colour values and thereby form the image mosaic, the method comprising the steps of:
  i) generating from the image mosaic a high spatial frequency image that extends across all pixel locations of the image mosaic, each pixel having an intensity value;
  ii) reducing mosaic artifacts by adjusting the intensity values of pixels in the high spatial frequency image, said adjustment being performed on pixels generated from a particular colour value at least in a first row and/or a first column of the high frequency image according to the intensity values for said pixels and the intensity values of pixels generated from another colour value;
  iii) generating for each colour value from the image mosaic a low spatial frequency intensity image, each pixel having an intensity value; and
  iv) after the adjustment of step ii), generating a demosaiced image for each of the colour values corresponding to said low frequency images by combining across all pixel locations the high frequency pixels with each of the low frequency intensity images,
  wherein step ii) includes adjusting the intensity values of the high frequency image in response to differences between neighbouring pixels in said first row and/or column of the high frequency image being below a first threshold value,
  wherein step ii) includes adjusting the intensity values of the high frequency image in response to differences between neighbouring pixels in said row(s) and column(s) of the high frequency image being below a second threshold value, said adjustment being performed on pixels generated from a particular colour value in both row(s) and column(s) of the high frequency image, and the second threshold value being less than the first threshold value, in which there is a predominance of pixels of one colour value as compared with the other colour values, each row and column including image pixels of both the predominant colour and one of the other colours.

14. An image processing method as claimed in claim 13, wherein step ii) includes assessing differences between one or more adjacent pairs of pixels that have been derived from the same non-predominant colour value, and differences between one or more adjacent pairs of pixels that have been derived from the predominant colour value.

15. An image processing method as claimed in claim 13, wherein the adjustment of step ii) includes scaling the intensity values of at least some of the pixels of the non-predominant colour value according to the intensity value of the low spatial frequency image of the pixels derived from the predominant colour value.

16. A method as claimed in claim 15, in which the intensity value of at least some of the pixels derived from the non-predominant colour value are scaled according to the intensity value of the low spatial frequency image of the pixels derived from the predominant colour value by adding the difference between the intensity value derived from said non-predominant colour value pixels and the low spatial frequency image derived from said non-predominant colour value pixels to intensity values from corresponding portions of said low spatial frequency image derived from the predominant colour value.

17. A method as claimed in claim 13, in which pixels with the predominant colour value alternate with pixels of one other colour in said row and/or column, and the difference in intensity values which is evaluated includes differences in intensity values between five immediately adjacent pixels in said row or column, said five pixels consisting of a first central pixel having the non-predominant colour, a second pixel and a third pixel each having the predominant colour, said second pixel being on one side of the first pixel and said third pixel being on the opposite side of the first pixel, and a fourth pixel and a fifth pixel each having the non-predominant colour, said fourth pixel being adjacent the second pixel and said fifth pixel being adjacent the third pixel.

18. A method as claimed in claim 17, in which the difference in intensity values which includes a first difference between the second pixel and the third pixel, a second difference between the first pixel and the fourth pixel, and a third difference between the first pixel and the fifth pixel.

19. An image processing method of de-mosaicing an image mosaic, the image mosaic including a plurality of image pixels and each image pixel having one of at least three colour values and having an intensity value representing the intensity of the colour value for that pixel in the image mosaic, the pixels of each colour value being interleaved in rows and columns across the image mosaic with pixels of different colour values and thereby form the image mosaic, the method comprising the steps of:
  i) generating from the image mosaic a high spatial frequency image that extends across all pixel locations of the image mosaic, each pixel having an intensity value;
  ii) reducing mosaic artifacts by adjusting the intensity values of pixels in the high spatial frequency image, said adjustment being performed on pixels generated from a particular colour value at least in a first row and/or a first column of the high frequency image according to the intensity values for said pixels and the intensity values of pixels generated from other colour values;
  iii) generating for each colour value from the image mosaic a low spatial frequency intensity image, each pixel having intensity value; and
  iv) after the adjustment of step ii), generating a demosaiced image for each of the colour values corresponding to said low frequency images by combining across all pixel locations the high frequency pixels with each of the low frequency intensity images,
v) in step i), forming the high spatial frequency image by first generating, for each colour value, from the pixels for that colour value, a partial high spatial frequency image that extends only across pixel locations of the image mosaic for that colour value;
vi) reducing mosaic artifacts by processing each of the partial high spatial frequency images according to step ii), and then using each of said processed partial high spatial frequency images in combination with each of the low frequency images to form a full colour de-mosaiced image.

20. A method as claimed in claim 19, comprising the steps of:
vii) for each colour value, generating from the image mosaic pixels for that colour value a low spatial frequency image that extends across all pixel locations of the image mosaic.

21. A device for de-mosaicing an image mosaic to form a full colour image, the device comprising a processor arrangement storing image mosaic data representative of an image mosaic having a plurality of image pixels, said image mosaic data including for each pixel one of at least three colour values and an intensity value representing the intensity of the colour value for that pixel in the image mosaic, the pixels of each colour value being interleaved in rows and columns across the image mosaic with pixels of different colour values to form the image mosaic, wherein the processor arrangement is operable to:
a) generate from the image mosaic a high spatial frequency image that extends across all pixel locations of the image mosaic, each pixel having an intensity value;
b) adjust the intensity values of pixels in the high spatial frequency image to reduce mosaic effects, said adjustment being performed on pixels generated from a particular colour value at least in a first row and/or a first column of the high frequency image according to the intensity values for said pixels and the intensity values of pixels generated from another colour value;
c) generate for each colour value from the image mosaic a low spatial frequency image, each pixel having an intensity value;
d) after the adjustment of the intensity value, combine across all pixel locations the high frequency pixels with each of the low frequency images in order to generate a demosaiced image for each of the colour values corresponding to said low frequency images;
e) in operation a), form the high spatial frequency image by first generating, for each colour value from the pixels for that colour value, a partial high spatial frequency image that extends only across pixel locations of the image mosaic for that colour value;
f) reduce mosaic artifacts by processing each of the partial high spatial frequency images according to operation b), and then using each of said processed partial high spatial frequency images in combination with each of the low frequency images to form a full colour de-mosaiced image.

22. The device as claimed in claim 21, wherein the processor arrangement is operable to:
g) generate, for each colour value from the image mosaic pixels for that colour value, a low spatial frequency image that extends across all pixel locations of the image mosaic.

23. An image processing method of de-mosaicing an image mosaic, the image mosaic including a plurality of image pixels and each image pixel having one of at least three colour values and having an intensity value representing the intensity of the colour value for that pixel in the image mosaic, the pixels of each colour value being interleaved in rows and columns across the image mosaic with pixels of different colour values and thereby form the image mosaic, the method comprising the steps of:
i) generating from the image mosaic a high spatial frequency image that extends across all pixel locations of the image mosaic, each pixel having an intensity value;
ii) reducing mosaic artifacts by adjusting the intensity values of pixels in the high spatial frequency image, said adjustment being performed on pixels generated from a particular colour value at least in a first row and/or a first column of the high frequency image according to the intensity values for said pixels and the intensity values of pixels generated from another colour value;
iii) generating for each colour value from the image mosaic a low spatial frequency intensity image, each pixel having an intensity value; and
iv) after the adjustment of step ii), generating a demosaiced image for each of the colour values corresponding to said low frequency images by combining across all pixel locations the high frequency pixels with each of the low frequency intensity images, wherein step ii) includes adjusting the intensity values of the high frequency image in response to differences between neighbouring pixels in said first row and/or column of the high frequency image being below a first threshold value and adjusting the intensity values of the high frequency image in response to differences between neighbouring pixels in said row(s) and column(s) of the high frequency image being between the first threshold value and above a second threshold value, said adjustment being performed on pixels generated from a particular colour value in both row(s) and column(s) of the high frequency image, and the second threshold value being less than the first threshold value.

24. An image processing method of de-mosaicing an image mosaic, the image mosaic including a plurality of image pixels, each image pixel having one of at least three colour values and having an intensity value representing the intensity of the colour value for that pixel in the image mosaic, the pixels of each colour value being interleaved in rows and columns across the image mosaic with pixels of different colour values thereby forming the image mosaic, the method comprising the steps of:
i) generating from the image mosaic a high spatial frequency image that extends across all pixel locations of the image mosaic, each pixel having an intensity value;
ii) reducing mosaic artefacts by adjusting pixel values in the high spatial frequency image, said adjustment being performed on pixels generated from one or more colour values in the original mosaic according to the colour values of at least one of (a) said pixels and (b) pixels generated from other colour values;
iii) generating for each colour value from the image mosaic a low spatial frequency intensity image, each pixel having an intensity value;
iv) after the adjustment of step ii), generating a de-mosaiced image for each of the colour values corresponding to said low frequency images by combining, across all pixel locations, the high frequency pixels with each of the low frequency intensity images;

v) in step i), forming the high spatial frequency image by first generating, for each colour value, from the pixels for that colour value, a partial high spatial frequency image that extends only across pixel locations of the image mosaic for that colour value; and vi) reducing mosaic artifacts by processing each of the partial high spatial frequency images according to step ii), and then using each of said processed partial high spatial frequency images in combination with each of the low frequency images to form a full colour de-mosaiced image.

25. Apparatus for de-mosaicing an image mosaic, the image mosaic including a plurality of image pixels, each image pixel having one of at least three colour values and having an intensity value representing the intensity of the colour value for that pixel in the image mosaic, the pixels of each colour value being interleaved in rows and columns across the image mosaic with pixels of different colour values thereby forming the image mosaic, the apparatus comprising a processor arrangement for performing the steps of claim 24.

* * * * *